INVENTORS
ARTHUR L. LEE
ARTHUR B. COVAL

Jan. 15, 1963 A. L. LEE ET AL 3,073,423
CONSTANT MESH TRANSMISSION AND AUTOMATIC BRAKE THEREFOR
Filed Dec. 16, 1959 5 Sheets-Sheet 3

INVENTORS
ARTHUR L. LEE
ARTHUR B. COVAL
BY
ATTORNEY

United States Patent Office 3,073,423
Patented Jan. 15, 1963

3,073,423
CONSTANT MESH TRANSMISSION AND
AUTOMATIC BRAKE THEREFOR
Arthur L. Lee and Arthur B. Coval, Columbus, Ohio, assignors to Consolidation Coal Company, Pittsburgh, Pa., a corporation of Pennsylvania
Filed Dec. 16, 1959, Ser. No. 859,868
13 Claims. (Cl. 192—4)

This invention relates to a constant mesh transmission having an automatic brake and more particularly to a constant mesh transmission providing four speed ratios in one direction and three speed ratios in the other direction upon which a brake is adapted to automatically exert a braking force upon the transmission output shaft when the transmission input shaft exceeds a predetermined angular velocity.

This application is a continuation-in-part of our copending United States patent application Serial No. 734,166 filed May 9, 1958, now abandoned, and discloses, in many of its particulars, an invention that is an improvement of the hydraulically controlled transmission disclosed in United States Reissue Patent No. 24,327, dated June 11, 1957, issued to A. L. Lee.

The transmission shown and described in the above named Lee patent has three speed ratios in the forward direction and three speed ratios in the reverse direction. This speed arrangement has proved very satisfactory in haulage type vehicles that are employed in shuttle type haulage work at the same job site for extended periods of time. The present transmission is an improvement of the above named transmission in that an additional speed ratio is provided in one direction. This additional speed ratio provides a speed ratio that may be employed in traveling from one job site to another. Although we have added an additional speed ratio in one direction to the transmission disclosed in Reissue Patent No. 24,327 it should be noted that other meritorious features such as the constant mesh gearing and the external clutches taught by Lee are still retained in our improved transmission.

In addition to the provision of a fourth speed ratio in one direction of transmission operation, the basic transmission has been improved by the addition of an automatic brake mechanism as a safety feature. The automatic brake is designed primarily to inhibit the tendency of a heavy, haulage type vehicle to run away when traveling down a substantial grade. Thus, the transmission of such a vehicle is equipped with a brake which functions automatically to exert a braking force on the vehicle if it should exceed certain predetermined speeds.

The present invention broadly contemplates the provision of a brake which is actuatable to exert a braking force on the output shaft of the vehicle transmission and which, therefore, exerts a dynamic braking effect on the vehicle. The brake is automatically actuated by an actuator responsive to the speed of the input shaft of the transmission. The transmission input shaft speed is usually the speed of the prime mover shaft which drives the vehicle. By providing a brake actuator which is responsive to the transmission input shaft speed, the multiple speed ratios of the transmission itself may be utilized to provide a plurality of vehicle speeds at which the automatic brake will be actuated, the particular vehicle speed being determined by the particular transmission speed ratio that is then engaged.

To illustrate this feature of the present invention, consider the present transmission equipped with a brake that is actuated when the transmission input shaft exceeds a predetermined angular velocity. If the transmission is engaged in its highest speed ratio of output shaft speed to input shaft speed, the output shaft of the transmission, and therefore the vehicle itself, may reach a relatively high speed before the predetermined angular velocity of the transmission input shaft is exceeded and the brake is actuated. If, on the other hand, the transmission is engaged in its lowest speed ratio, the output shaft of the transmission, and therefore the vehicle itself, may attain only a relatively low speed before the brake is actuated and the braking force is exerted on the vehicle.

The present invention contemplates the provision of a hydraulically actuated brake system which has a master cylinder that is actuated through a lever arrangement. This lever arrangement is, in turn, actuated by the brake actuator—a centrifugal clutch operatively associated with the transmission input shaft—when the transmission input shaft exceeds a predetermined speed. Since a centrifugal clutch is utilized as the brake actuator, the force exerted upon the master cylinder of the brake system by the brake actuator will be a function of the square of the transmission input shaft speed. It is well recognized that the force exerted by the driving portion of a centrifugal clutch upon the driven portion is a function of the square of the driving portion speed. Accordingly, the force transmitted by the centrifugal clutch to the master cylinder and the braking force transmitted hydraulically from the master cylinder of the brake system to the brake itself will be a function of the square of the transmission input speed. Thus, one of the advantageous features of the present invention is the provision of a brake whose braking force on the transmission output shaft increases as the square of the speed of the transmission input shaft.

With the foregoing considerations in mind, it is a principal object of the present invention to provide a novel combination of an improved constant mesh transmission and a brake which automatically exerts a braking force on the transmission output shaft when the transmission input shaft exceeds a predetermined speed.

Another object of this invention is to provide a constant mesh transmission having four speed ratios in one direction and three speed ratios in the other direction.

Another object of this invention is to provide an automatic brake for a transmission having a plurality of fixed speed ratios, the brake being designed to exert a braking force that increases as the square of the transmission input shaft speed on the transmission output shaft when the transmission input shaft exceeds a predetermined speed.

Another object of this invention is to provide a combination of a constant mesh transmission having four speed ratios in one direction and three speed ratios in the other direction and a hydraulic disc brake actuated by a centrifugal clutch driven at a speed proportional to the transmission input speed.

Another object of this invention is to provide a constant mesh transmission providing four speeds in one direction and three speeds in the other direction having all the clutch elements external to the transmission housing.

Another object of this invention is to provide a transmission having a plurality of speeds in both directions that is easy to fabricate, assemble, install and maintain.

This invention comprises the new and improved construction and combination of parts and their operating relation to each other which will be described more fully hereinafter and the novelty of which will be particularly pointed out and distinctly claimed.

In the accompanying drawings, to be taken as part of the specification, there is clearly and fully illustrated a preferred embodiment of this invention, in which drawings:

FIGURE 7 is a developed longitudinal section similar to FIGURE 3 showing the arrangement of the automatic brake and brake actuating means on the transmission of FIGURES 1–6.

In the drawings, like reference characters refer to similar elements of the invention throughout all the figures of the drawings. To facilitate the description of the invention, the improved transmission mechanism will first be described in detail without the automatic brake mechanism installed thereon. This detailed description will refer particularly to FIGURES 1 through 6 of the drawings. The novel combination of the improved transmission and the automatic brake mechanism will then be described in detail insofar as that structure differs from the improved transmission alone. Particular reference will be made to FIGURES 7 through 10 of the drawings in describing the automatic brake-equipped transmission.

Figure 1:
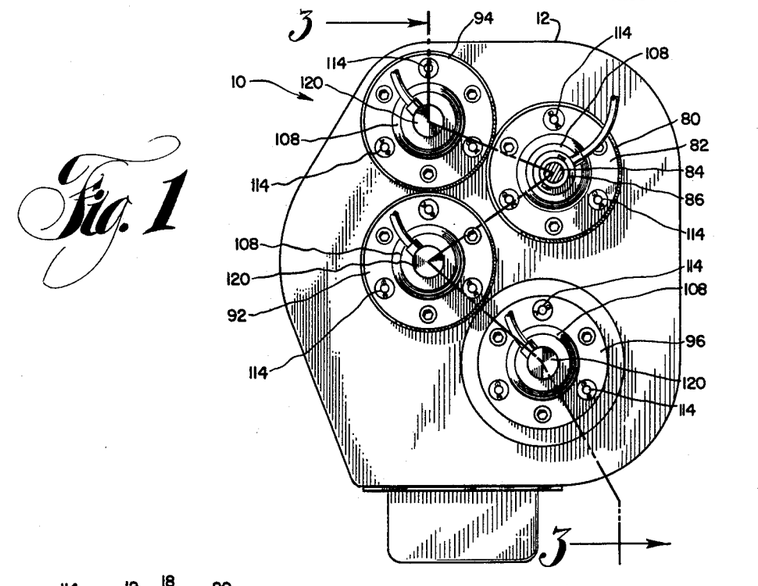
FIGURE 1 is an end elevational view of a preferred form of the improved transmission mechanism without the automatic brake mechanism.
Figure 2:
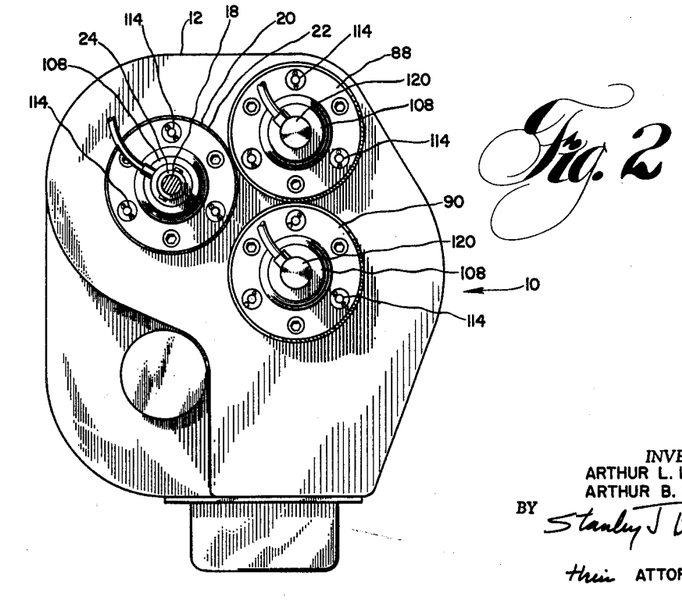
FIGURE 2 is an elevational view looking toward the opposite end of the transmission mechanism of FIGURE 1.
Figure 3:
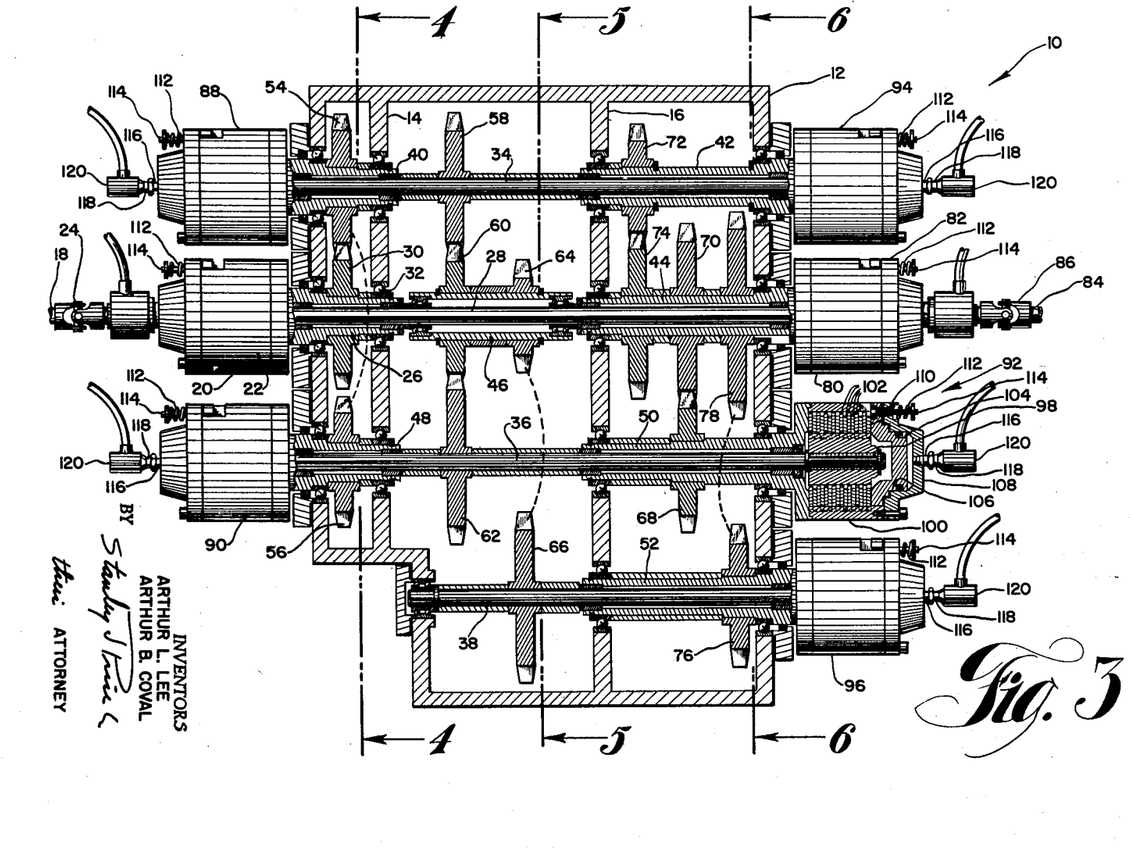
FIGURE 3 is a developed longitudinal section taken along the line 3—3 of FIGURE 1 showing the arrangement of the transmission gears and the associated control clutches.
Figures 4, 5, 6:
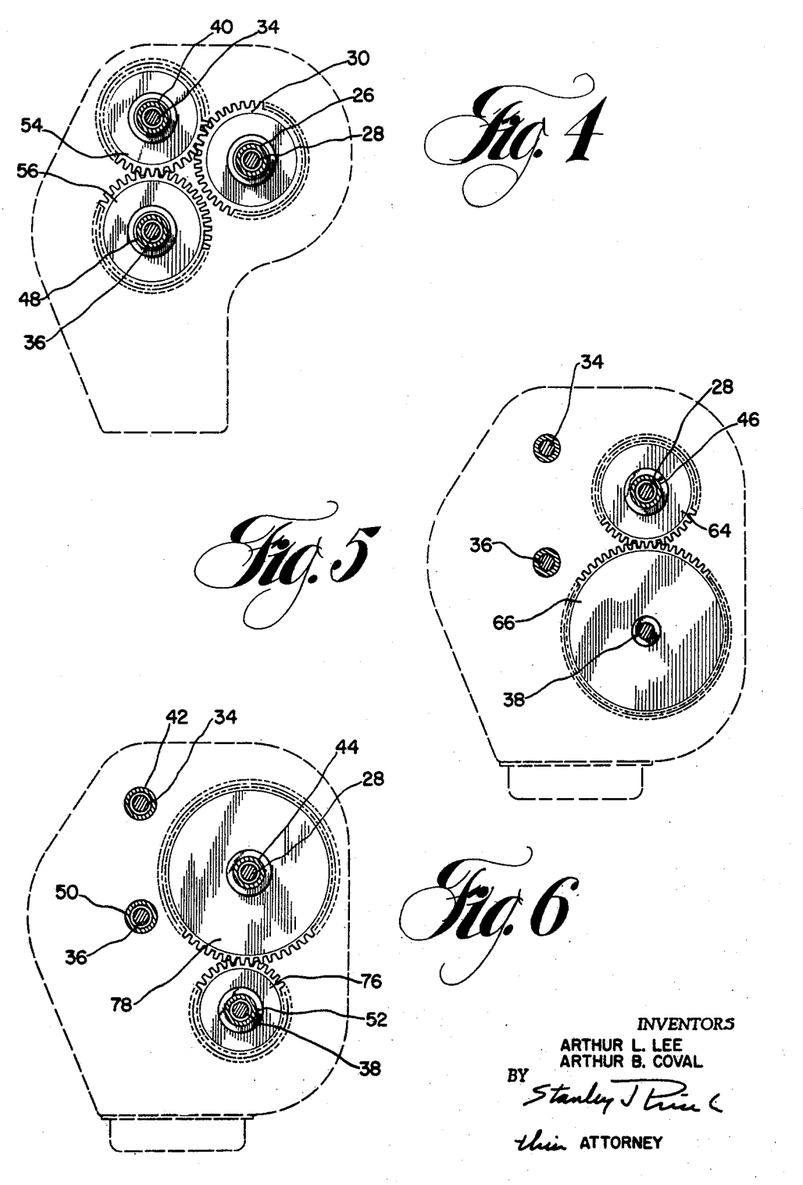
FIGURES 4, 5 and 6 are transverse sectional views taken along the lines 4—4, 5—5 and 6—6 of FIGURE 3.

Referring to FIGURE 3 the improved transmission mechanism generally designated by the numeral 10 has a housing 12 adapted to contain a lubricant bath and enclosing the transmission gearing which rotate in the lubricant bath. The housing 12 has a pair of inner partitions or walls 14 and 16 which have apertures therethrough to support countershafts and tubular shafts therein as will be later described. A prime mover, not shown, drives a propellor shaft 18 which is connected to the exterior housing 20 or clutch 22 by means of a universal connection 24. The prime mover employed is preferably unidirectional so that the propeller shaft 18 and clutch housing 20 rotate in the same direction irrespective of the direction of rotation of the output shaft.

The clutch housing 20 is connected to a tubular shaft 26 that is coaxially positioned on a main shaft 28 and is freely rotatable thereon. The shaft 28 is defined as a main shaft to distinguish it from the countershafts later described. A spur gear 30 is splined to or otherwise nonrotatably secured to the tubular shaft 26 for rotation therewith. The tubular shaft 26 is supported adjacent the clutch housing 20 by means of roller bearings 32 and at its other end is supported in an aperture of the first inner wall 14 by means of other roller bearings 32.

Three countershafts 34, 36 and 38 are journaled in the housing 12 in parallel spaced relation to each other. The countershafts 34 and 36 and main shaft 28 have their end portions extending outwardly beyond the side walls of housing 12. The countershaft 38 is also journaled in the side wall of housing 12 and has one end portion extend beyond the housing side wall and its other end supported in bearing 32 in the housing side wall. The countershaft 34 for convenience will be termed first countershaft, countershaft 36, the second countershaft and countershaft 38, the third countershaft.

The first countershaft 34 has a pair of tubular shafts 40 and 42 journaled thereon in rotatable relation thereto. The main shaft 28 has a tubular shaft 26 (already described) and tubular shaft 44 coaxially positioned thereon in rotatable relation thereto. In addition, the main shaft 28 has a third tubular shaft 46 coaxially positioned thereon in rotatable relation thereto. The second countershaft 36 has a pair of tubular shafts 48 and 50 coaxially positioned thereon in rotatable relation thereto. Third countershaft 38 has a tubular shaft 52 coaxially positioned thereon in rotatable relation thereto. The tubular shafts 40, 42, 26, 44, 48, 50 and 52 all have end portions extending beyond the side walls of the housing 12.

A forward directional spur gear 54 is keyed to or otherwise nonrotatably secured to tubular shaft 40 for rotation therewith. The first directional gear 54 is in meshing relation with spur gear 30 and is driven thereby. A second directional gear 56 is nonrotatably secured to tubular shaft 48 which is coaxially positioned on the second countershaft 36. Second directional gear 56 is in meshing relation with and is driven by first directional gear 54. A first connecting gear 58 is secured to and rotatable with the first countershaft 34. A second connecting gear 60 is secured to and rotatable with the tubular shaft 46 coaxially positioned on main shaft 28. The second connecting gear 60 is in meshing relation with first connecting gear 58. A third connecting gear 62 is secured to and rotatable with the second countershaft 36. The third connecting gear 62 meshes with second connecting gear 60. A fourth connecting gear 64 is secured to and rotatable with the tubular shaft 46 arranged on main shaft 28. A fifth connecting gear 66 is secured to and rotatable with the third countershaft 38. The connecting gear 66 meshes with connecting gear 64. A first change speed gear 68 is secured to and rotatable with the tubular shaft 50 arranged on second countershaft 36. The change speed gear 68 meshes with another gear 70 secured to and rotatable with tubular shaft 44 arranged on main shaft 28. A second change speed gear 72 is secured to and rotatable with tubular shaft 42 arranged on first countershaft 34. The second change speed gear 72 meshes with another gear 74 secured to and rotatable with tubular shaft 44 arranged on main shaft 28. A third change speed gear 76 is secured to and rotatable with the tubular shaft 52 arranged on the third countershaft 38. The third change speed gear 76 meshes with another gear 78 which is also secured to and rotatable with the tubular shaft 44.

The end portion of tubular shaft 44 that extends beyond the housing side wall is secured to the external housing 80 of the clutch 82. The housing 80 is connected to an output shaft 84 by means of a universal connection 86. Thus rotation of input shaft 18 is transmitted through the universal connection 24 to the external housing 20 of clutch 22, thence through the transmission 10 to the external housing 80 of clutch 82 and the universal connection 86 to the output shaft 84.

Arranged exteriorly of the housing 12 there are the following clutches:

88—forward directional clutch which is arranged to frictionally engage tubular shaft 40 to the first countershaft 34.

90—reverse clutch which is arranged to frictionally engage tubular shaft 48 to the second countershaft 36.

92—a first change speed clutch which is arranged to frictionally engage tubular shaft 50 to second countershaft 36.

94—a second change speed clutch which is arranged to frictionally engage tubular shaft 42 to first countershaft 34.

96—a third change speed clutch which is arranged to frictionally engage tubular shaft 52 to countershaft 38.

22—82—fourth speed forward clutches arranged to respectively engage tubular shafts 26 and 44 to main shaft 28.

The above enumerated clutches are of the hydraulically operated multi disc type and are arranged exteriorly of the transmission housing for ready accessibility. For illustration, the first speed change speed clutch 92 is shown in section in FIGURE 3. Each clutch includes an inner member 98 keyed to the countershaft which in the illustration is second countershaft 36, and an outer rotatable clutch housing or casing 100 secured to the tubular shaft 50. The inner member 98 and the outer housing or casing 100 carry interleaved clutch discs or plates 102 which when pressed together serve to frictionally engage the countershaft to the tubular shaft for rotation together. A piston 104 is received in a cylindrical bore 106 formed within an end enclosure 108. The piston 104 has a clutch operating portion 110 which abuts the discs 102 and is adapted to move the discs into a clutch engaged position. The piston 104 is normally held in a retracted or clutch disengaged position by means of the springs 112 which act on bolts 114. The cylinder end enclosure 108 has an element 116 of a conventional fluid swivel 118 connected therethrough and an outer element 120 of the swivel is coupled to a fluid conduit. The fluid conduit and swivel coupling 118 is arranged to supply fluid under pressure to the cylinder bore 106. The fluid pressure moves the piston 104 until the clutch operating portion 110 moves the clutch discs 102 into frictional engagement. In the absence of fluid under pressure within the cylinder bore 106 the springs 112 retract the piston 104 and release the interleaved clutch discs 102.

The clutches 22 and 82 are similar in construction to the remaining clutches 88, 90, 92, 94 and 96, however, fluid under pressure is fed internally to the cylinder bore in a well known manner. Again, the method of supplying fluid under pressure to the clutches 22 and 82 does not form a part of this invention. The above details of the clutch 92 are set forth for illustrative purposes only, it being understood that other types of clutches could be used with equal facility and the specific clutch construction does not form a part of this invention.

OPERATION

The transmission 10 is capable of providing four speeds in one direction and three speeds in a reverse direction. The additional or fourth speed provides a substantially direct drive between the input shaft 18 and the output shaft 24. This direct drive in fourth speed forward is obtained by engaging both clutch 22 and clutch 82. In this manner tubular shafts 26 and 44 are frictionally engaged with main shaft 28. Thus the rotation of input shaft 18 is transmitted through clutch housing 20 to tubular shaft 26 thence to main shaft 28 through clutch 82 to tubular shaft 44 and clutch housing 80 and to output shaft 84.

The directional clutches 88 and 90 selectively engage directional gears 54 or 56 to the respective first or second countershafts 34 or 36. Activation of either the first countershaft 34 or the second countershaft 36 transmits rotation to the connecting gears 58, 60, 62, 64 and 66. Thus when either the first or second countershaft 34 or 36 are rotating the tubular shaft 46 as well as third countershaft 38 is rotating because of the arrangement of the connecting gears. The change speed clutches 92, 94 and 96 engage either the first, second or third countershafts 34, 36, 38 to the respective tubular shafts coaxially positioned thereon. The change speed gearing then drivingly connects the selected tubular shaft to the tubular shaft 44 which is arranged on main shaft 28. Tubular shaft 44 in turn is connected through clutch housing 80 to output shaft 84 thus providing selected speeds in selected directions.

When the fourth speed is desired in the forward direction the directional clutches 88 and 90 are preferably disengaged and clutches 22 and 82 are engaged. In this manner rotation of input shaft 18 is transmitted through clutch housing 20 to tubular shaft 26 and through engaged clutch 22 to main shaft 28. The rotation of main shaft 28 is transmitted to the output shaft 84 through engaged clutch 82 and clutch housing 80.

The various clutch engagements required and the various gearing steps in the direction and speed ratios are as follows:

Forward First Speed

Clutches engaged—88 and 92.
Power from input shaft 18 is transmitted through clutch housing 20 to tubular shaft 26 and thence to spur gear 30. The spur gear 30 meshing with forward directional gear 54 drives the same and tubular shaft 40. Since forward clutch 88 is engaged, rotation of tubular shaft 40 is transmitted to first countershaft 34. Connecting gears 58, 60 and 62 transmit the rotation of first countershaft 34 to second countershaft 36. First change speed clutch being engaged frictionally engages second countershift 36 to the tubular shaft 50 for rotation therewith. Change speed gear 68 secured to tubular shaft 50 then transmits rotation to gear 70 which is meshing therewith. The gear 70 transmits rotation to tubular shaft 44 and thence to clutch housing 80 and output shaft 84 in the forward direction first speed.

Forward Second Speed

Clutches engaged—88 and 94.
Power is transmitted through the following gears, shafts and clutches. Input shaft 18, clutch housing 20, tubular shaft 26, spur gears 30 and 54, tubular shaft 40, forward directional clutch 88, first countershaft 34, second change speed clutch 94, tubular shaft 42, gears 72, 74, to tubular shaft 44 and thence through clutch housing 80 to output shaft 84 in forward direction second speed.

Forward Direction Third Speed

Clutches engaged—88 and 96.
Power is transmitted as follows: input shaft 18, clutch housing 20, tubular shaft 26, spur gears 30, 54, tubular shaft 40, forward directional clutch 88, first countershaft 34, connecting gears 58, 60, tubular shaft 46, connecting gears 64, 66, third countershaft 38, third change speed clutch 96, tubular shaft 52, gears 76, 78 to tubular shaft 44, clutch housing 80 and thence to output shaft 84 in forward direction third speed.

Forward Direction Fourth Speed

Clutches engaged—22 and 82.
Power is transmitted as follows: input shaft 18, clutch housing 20, tubular shaft 26, clutch 22, main shaft 28, clutch 82, clutch housing 80 and output shaft 84 in forward direction fourth speed.

Reverse Direction First Speed

Clutches engaged—90 and 92.
Power is transmitted as follows: shaft 18, clutch housing 20, tubular shaft 26, spur gears 30, 54, 56, tubular shaft 48, reverse directional clutch 90, second countershaft 36, first change speed clutch 92, tubular shaft 50, gears 68 and 70, tubular shaft 44, clutch housing 80 and output shaft 84.

Reverse Direction Second Speed

Clutches engaged—90 and 94.
Power is transmitted as follows: input shaft 18, clutch housing 20, tubular shaft 26, gears 30, 54 and 56, tubular shaft 48, reverse directional clutch 90, second countershaft 36, connecting gears 62, 60 and 58, first countershaft 34, second change speed clutch 94, tubular shaft 42, gears 72 and 74, tubular shaft 44 and clutch housing 80 to output shaft 84 in reverse direction second speed.

Reverse Direction Third Speed

Clutches engaged—90 and 96.
Power is transmitted as follows: input shaft 18, clutch housing 20, tubular shaft 26, gears 30, 54, 56, tubular shaft 48, reverse directional clutch 90, second countershaft 36, connecting gears 62, 60, 64 and 66, third countershaft 38, third change speed clutch 96, tubular shaft 52, gears 76 and 78, to tubular shaft 44, clutch housing 80 and thence to output shaft 84 in reverse direction third speed.

With the foregoing description of the improved transmission mechanism in mind, the combination of the improved transmission mechanism with the novel automatic brake may be described in detail with particular reference to FIGURES 7 through 10 of the drawings. Referring to FIGURE 7, the transmission mechanism of FIGURES 1–6 is shown in longitudinal section with the automatic brake mechanism mounted thereon. Portions of the automatic brake mechanism are shown in a semi-schematic manner in FIGURE 7, however, these portions are more clearly shown in FIGURES 8 and 9.

As shown in FIGURE 7 the transmission housing 12 has a generally cylindrical extension 122 formed on the rear end wall of the housing. Cylindrical extension 122 is coaxial with and surrounds clutch 82 of the transmission mechanism. The cylindrical extension 122 supports the stationary portion of a brake mechanism. The stationary portion of the brake mechanism is indicated generally at 124. In the automatic brake embodiment of the transmission, the external housing 80 of the clutch 82 has formed thereon a brake shaft 126 which rotates as a unit with the external housing 80. The brake shaft 126 extends generally between the housing 80 of clutch 82 and the universal connection 86 which joins the transmission output shaft 84 to clutch housing 80. The brake shaft 126 may be thought of as an extension of the external housing 80 which transmits rotary power to output shaft 84 through universal 86. The brake shaft 126 is rotatably supported within the housing extension 122 by a bearing assembly 128.

A brake disc hub 130 is nonrotatably secured to the brake shaft 126 but is free to move axially a limited amount relative to brake shaft 126. Hub 130 is secured to the shaft 126 as a by a splined connection 132. A brake disc 138 is secured to the hub 130 and rotates as a unit with hub 130. The brake disc 138 has a plurality of radial cooling pasages 140 which extend from adjacent the hub 130 to the outer periphery of the brake disc so that air circulates through the brake disc to aid in dissipating heat generated when a frictional braking force is applied to the brake disc.

A brake supporting member 142 is formed on the end of housing extension 122 to support the stationary portion 124 of the brake mechanism. Brake supporting member 142 has a plurality of brake cylinders 144 formed thereon. Brake cylinders 144 receive brake pistons 146 to form a plurality of reciprocating fluid motors. Metal brake shoes 148 have ends 148a which protrude into the brake cylinders 144. Spring members 150 snugly receive the brake shoe ends 148a and urge them toward brake pistons 146. Annular filler members 151 fill the space behind springs 150 and help seal the ends of brake cylinders 144. Each of the brake shoes 148 has a brake friction member 152 secured to it as by rivets 154.

Hydraulic fittings 156 serve to connect hydraulic lines to the brake cylinders 144. When pressurized fluid is introduced into brake cylinders 144 brake shoes 148 are urged toward the brake discs 138 and brake friction members 152 frictionally contact the brake disc 138 to exert the braking force thereon. When the pressurized fluid is vented from the brake cylinders 144, springs 150 urge the brake shoes 148 away from the brake disc 138 to release the baking force. A hydraulic actuating line 158 (shown schematically in FIG. 7) is split into branches 158a and 158b by a T fitting. Branches 158a and 158b are secured to the hydraulic fittings 156 to provide the pressurized fluid to the brake cylinders 144.

Figure 8:
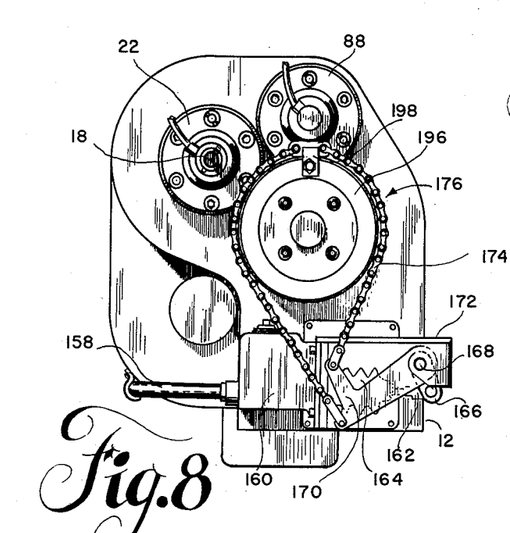
FIGURE 8 is an end elevational view similar to FIGURE 2 showing the brake actuating mechanism mounted on the transmission and the modification of the transmission housing to receive the actuating mechanism.
Figure 9:
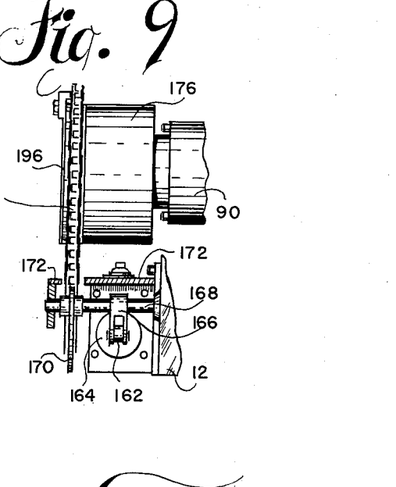
FIGURE 9 is a fragmentary side elevation showing the brake actuating mechanism of FIGURE 8.

A master cylinder 160 which may be a suitable commercially available unit whose specific construction forms no part of the present invention pressurizes fluid when actuated and forces it through hydraulic actuating line 158. Master cylinder 160 is shown schematically in FIGURE 7 and is shown in somewhat more detail in FIGURES 8 and 9. As seen in FIGURES 8 and 9, the body of the master cylinder 160 is secured to the transmission housing 12. The transmission housing 12 is slightly modified over that shown in FIGURES 1 and 2 to receive the master cylinder 160. The master cylinder 160 has an actuating piston arm or plunger 162 extending from its body. Plunger 162 has a bellows seal 164 surrounding it so that plunger 162 may be reciprocated relative to the master cylinder 160 without leakage occurring between the plunger and the cylinder body. As shown in FIGURES 8 and 9, master cylinder 160 is in its normal, unactuated position. To actuate master cylinder 160, plunger 162 is moved toward the left as viewed in FIGURE 8 or inwardly toward the body of master cylinder 160.

The actuating linkage for the master cylinder 160 consists of link 166, shaft 168, and actuating arm 170, all of which are supported by the actuating linkage support 172 that is fixed to the transmission housing. The linkage support 172 rotatably receives the shaft 168. The link 166 is rotatably secured to the end of the plunger 162 at one of its ends, and is nonrotatably secured to the shaft 168 at its other end. Also nonrotatably secured to the shaft 168 is actuating arm 170 which extends radially therefrom. Thus, when actuating arm 170 is rotated about shaft 168 in a clockwise direction as viewed in FIGURE 8, shaft 168 is rotated in a clockwise direction, thus causing link 166 to force plunger 162 toward the left and actuate master cylinder 160 to force pressurized fluid through hydraulic line 158.

To summarize the function of master cylinder 160, the master cylinder 160, when in its normal, unactuated position as shown in FIGURE 8, generates no fluid pressure in line 158. When master cylinder 160 is actuated by the rotation of actuating arm 170 in a clockwise direction as viewed in FIGURE 8, pressurized fluid at a pressure proportional to the force exerted on arm 170 is forced by the master cylinder through hydraulic actuating line 158 to actuate the disc brake on the transmission output shaft.

As seen in FIGURES 7, 8 and 9, the actuating arm 170 is connected to a chain 174 which is, in turn, operatively joined to a centrifugal clutch 176. The centrifugal clutch 176 is shown in detail in FIGURES 7 and 10. Referring now to those figures, the centrifugal clutch will be described although it is a commercially available unit whose exact construction forms no part of the present invention. The centrifugal clutch 176 has a driving portion 178 which is nonrotatably secured to the external housing of the reverse directional clutch 90 to rotate as a unit therewith. The clutch driving portion 178 has a coaxial bore 178a formed therein to allow fluid communication from swivel 118 (FIGURE 7) to actuate the reverse directional clutch 90. The driving portion 178 also has bolted thereto a web member 180 secured to the driving portion 178 as by bolts 182. The web member 180 (FIG. 10) has a plurality of radiating spokes 180a that have enlarged end portions 180b. The web member 180 rotates as a unit with the clutch driving portion 178 and the external housing of the reverse directional clutch 90.

Figure 10:
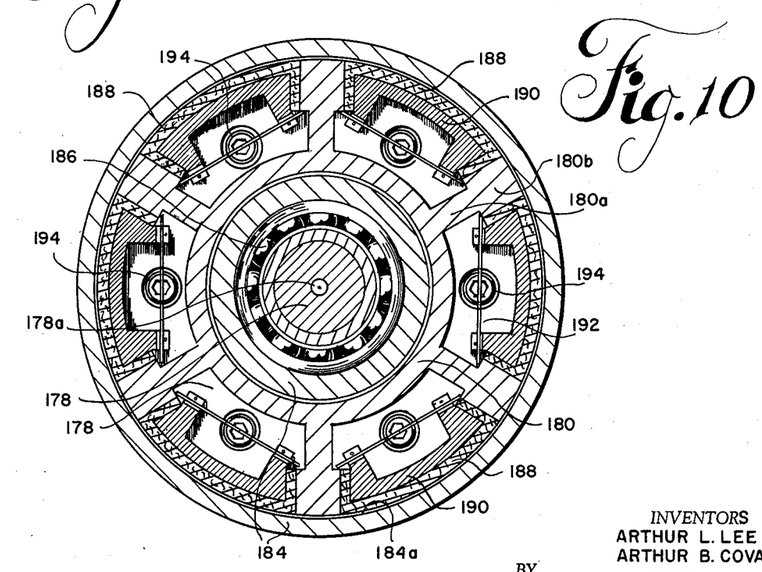
FIGURE 10 is an enlarged sectional view of the centrifugal actuating clutch taken on line 10—10 of FIGURE 7.

The centrifugal clutch 176 has a driven portion 184 with a smooth cylindrical internal surface 184a. Bearings 186 journal the clutch driven portion 184 for rotation relative to the clutch driving portion 178. A plurality of clutch shoes 188 are disposed between the radiating spokes 180a of web member 180. Clutch shoes 188 are formed of material having a high coefficient of friction such as brake shoe fabric. The clutch shoes 188 have shoe weights 190 formed integrally therewith. Each clutch shoe 188 has a clutch shoe spring 192 cooperating therewith and urging the clutch shoe radially inwardly of the web member 180. The shoe springs 192 are flat and abut the enlarged spoke ends 180b of the web members 180. Adjusting bolts 194 are provided to adjust the tension on springs 192.

It will be appreciated that as the clutch driving portion 178 and the web member 180 rotate, the centrifugal force created by their rotation tends to force the clutch shoes 188 radially outwardly against the force of springs 192. When the shoes 188 are so forced, they contact the smooth cylindrical internal surface 184a of the clutch driven portion 184 and cause the driven portion to rotate with the clutch driving portion. The exact speed at which the shoes 188 contact and cause the driven portion to be rotated is governed by the weight of shoe weights 190 and the force exerted by springs 192. This speed may be adjusted by changing the tension on springs 192 by the use of adjusting bolts 194. The driving force exerted by the clutch driving portion 178 upon the clutch driven portion 184 is due to the centrifugal force exerted by the shoes 188 and, accordingly, the driving force is a function of the square of the speed of the clutch driving portion.

Formed on the clutch driven portion 184 is chain securing member 196 which carries clamp 198. Clamp 198 clamps the chain 174 to the chain securing member and causes chain 174 to be moved whenever the clutch driven portion is rotated.

Referring to FIGURE 8, it will be seen that when the chain 174 is moved by the clutch driven portion being rotated in a clockwise direction, the master cylinder actuating arm 170 is rotated in a clockwise direction to move the plunger 162 causing the normally unactuated master cylinder 160 to be actuated. The master cylinder 160 is so constructed that it will return and cause arm 170 to rotate in a counter clockwise direction if the force on chain 174 is released. Thus, when the centrifugal clutch is rotated at such a speed that the shoes of the clutch engage the clutch driven portion and rotate it, the chain 174 moves until the master cylinder 160 is actuated with a force determined by the clutch driving portion speed squared. At that time, the centrifugal clutch driven member 184 slips relative to the clutch shoes until the clutch driving portion speed is reduced sufficiently for the shoes to move inwardly under the force of springs 192. When the speed is so reduced, the master cylinder 160 causes the arm 170 to return to the position shown in FIGURE 8.

With the foregoing construction and arrangement of parts in mind, the operation of the transmission mechanism and automatic brake will become readily apparent. As viewed in FIGURE 7, the transmission input shaft 18 is driven by a prime mover which drives the vehicle on which the transmission is mounted. The input shaft 18 causes the external housing 20 of clutch 22 to rotate and thereby causes the tubular shaft 26 and gear 30 to rotate as a unit with the clutch housing 20. Gear 30 meshes with gear 54 which in turn meshes with the second directional gear 56. The gear 56 causes the tubular shaft 48 and the external housing of the clutch 90 to rotate. The external housing of clutch 90 is nonrotatably secured to the centrifugal clutch driving portion 178. Thus, it will be appreciated that the centrifugal clutch driving portion 178 constantly rotates at a speed either equal to or proportional to the transmission input speed. Stated another way, if the gear 30 and gear 56 are the same size, then the clutch driving portion 178 will rotate at the same angular velocity as the input shaft 18. If gears 30 and 56 are of different sizes, then the clutch driving portion 178 will rotate at a speed proportional to the speed of input shaft 18. In either event, the speed responsive clutch will be driven at a speed proportional to the transmission shaft input shaft.

The brake disc 138 is secured to and rotates as a unit with the external housing of clutch 82 so that it rotates with the transmission output shaft. Each time the brake cylinders 144 are actuated, a braking force is exerted upon the transmission output shaft. It will be appreciated that the brake disc could be secured to the external housing of any one of the clutches 92, 94 or 96 since each of these clutch housings rotate at a speed proportional to the transmission output speed through gears 68, 72 and 76 respectively. Since this is a constant mesh transmission, the rotating parts rotate at proportional speeds during all periods of operation.

The master cylinder 160 produces pressurized fluid to actuate the automatic brake cylinders 144. When the transmission input shaft 18 rotates at a speed greater than some predetermined speed, the centrifugal clutch 176 will be actuated, thus causing the normally unactuated master cylinder 160 to be actuated and pressurize the brake cylinders 144. This action will exert a braking force on the transmission output shaft. The braking force exerted on the transmission output shaft will serve to reduce the vehicle speed and, accordingly, will reduce the speed of the transmission input shaft 18. When this speed is reduced, the centrifugal clutch 176 will be de-actuated and the normally unactuated master cylinder 160 will once again be de-actuated, thus relieving the braking force on the transmission output shaft. It will be noted that the operation of the automatic brake occurs as a result of transmission input shaft speed changes and is unaffected by the control of the vehicle operator, except as operator control affects the speed of the vehicle. Further, it will be appreciated that the input shaft speed 18 will reach the predetermined speed at which the centrifugal clutch 176 is actuated for a lower vehicle speed when the transmission is in a lower speed ratio and will reach that predetermined speed at higher vehicle speeds when the transmission is in a high speed ratio.

The braking force exerted upon the brake disc 138 and therefore upon the transmission output shaft will be proportional to the square of the speed of the transmission input shaft when the disc brake is actuated. As has already been discussed, the driving force exerted by the centrifugal clutch driving portion 178 upon the centrifugal clutch driven portion 184 will be proportional to the square of the driving portion speed since the driving force will be exerted by the centrifugal force of the clutch shoes 188 which is a square function of the rotational speed. The driving force exerted on the clutch driven portion 184 will be transferred to the plunger 162 of the master cylinder 160 through the chain 174 and the master cylinder actuating linkage including arm 170 and link 166.

The force with which the plunger 162 is moved into the master cylinder 160 will control the degree of fluid pressure generated in the master cylinder and in the actuating line 158. This pressure will in turn, produce the braking force on brake disc 138. Thus, the force on plunger 162 will be a force proportional to the square of the speed of the transmission input shaft, and the pressure generated in the line 158 will be proportional to that same input speed squared since it is produced by the force on plunger 162.

The significance of having the braking force applied to the transmission output shaft proportional to the square of the transmission input shaft speed is apparent when the braking action on a heavy vehicle is considered. Consider a heavy vehicle moving down a steep grade where the force of gravity and inertia of motion of the vehicle cause its speed to increase. With the transmission and automatic brake of the instant invention installed on the vehicle, the transmission will be locked in its lowest speed ratio. Transmission clutches 88 and 92 will be engaged to achieve this low speed ratio. With the transmission in its lowest speed ratio the vehicle will be moving at a relatively slow speed when the transmission input shaft speed increases to the predetermined amount sufficient to actuate the centrifugal clutch 176. This actuation of the centrifugal clutch 176 at just above the predetermined speed of the transmission input shaft will produce a relatively small force on plunger 162 of master cylinder 160 so that the disc brake is smoothly engaged by a relatively low pressure in line 158. A relatively light braking force will be exerted on the transmission output shaft.

If the light braking force is effective to slow the vehicle, the transmission input speed will be reduced and centrifugal clutch 176 will disengage. If, however, the relatively light initial braking force is not sufficient to slow the vehicle (as will probably be the case with a heavy vehicle on a steep grade) the transmission input speed will increase due to the direct drive between the transmission input speed and the wheels of the vehicle. This increased transmission input shaft speed will result in an increase in the braking force on the transmission output shaft proportional to the square of the speed of the input shaft. Thus, since the braking force increases as the square of the input shaft speed, a much greater braking force will be applied more quickly to slow the vehicle. Of course, when the vehicle slows sufficiently that the transmission input shaft speed drops below the predetermined value required to actuate the centrifugal clutch, the automatic brake will be disengaged.

According to the provisions of the patent statutes, we have explained the principle, preferred construction and mode of operation of our invention and have illustrated and described what we now consider to represent its best embodiments. However, we desire to have it understood that, within the scope of the appended claims, the invention may be practiced otherwise than as specifically illustrated and described.

We claim:

1. The combination comprising a transmission having four speeds in the forward direction and three speeds in the reverse direction, said transmission including a fixed housing, a rotatable power input shaft, a rotatable power output shaft, a first countershaft, a second countershaft, a third countershaft and a main shaft, said countershafts and said main shaft arranged in parallel spaced relation to each other within said housing, said countershafts adapted to rotate in both directions, constant mesh gearing including a pair of directional gears, connecting gears and a plurality of change speed gears, said connecting gears arranged to drivingly connect said three countershafts to each other for rotation together, a pair of directional clutches, a plurality of change speed clutches and a pair of other clutches, said input shaft connected to one of said other clutches, said output shaft connected to the second of said other clutches, said directional clutches adapted upon selective engagement to transmit rotation of said directional gears to said interconnected countershafts in a predetermined direction, said change speed clutches arranged upon selective engagement to transmit rotation of said interconnected countershafts to said output shaft to thereby provide a plurality of output shaft speeds having fixed ratios to said input shaft speeds, said other clutches adapted upon engagement to transmit rotation from said input shaft through said main shaft to said output shaft to provide in the forward direction an additional output shaft speed having a fixed ratio to said input shaft speed, brake means actuatable to exert a braking force upon said transmission output shaft, actuating means for said brake means, said actuating means including speed responsive means operatively connected to said input shaft, said actuating means operatively connected to said brake means, said speed responsive means being responsive to the speed of said transmission input shaft to cause said actuating means to actuate said brake means when said input shaft speed exceeds a predetermined speed.

2. The combination comprising a transmission having four speeds in the forward direction and three speeds in the reverse direction, said transmission including a fixed housing, a rotatable power input shaft, a rotatable power output shaft, a first countershaft, a second countershaft, a third countershaft and a main shaft, said countershafts and said main shaft arranged in parallel spaced relation to each other within said housing, said countershafts adapted to rotate in both directions, constant mesh gearing including a pair of directional gears, connecting gears and a plurality of change speed gears, said connecting gears arranged to drivingly connect said three countershafts to each other for rotation together, a pair of directional clutches, a plurality of change speed clutches and a pair of other clutches, said input shaft connected to one of said other clutches, said output shaft connected to the second of said other clutches, said directional clutches adapted upon selective engagement to transmit rotation of said directional gears to said interconnected countershafts in a predetermined direction, said change speed clutches arranged upon selective engagement to transmit rotation of said interconnected countershafts to said output shaft to thereby provide a plurality of output shaft speeds having fixed ratios to said input shaft speeds, said other clutches adapted upon engagement to transmit rotation from said input shaft through said main shaft to said output shaft to provide in the forward direction an additional output shaft speed having a fixed ratio to said input shaft speed, said directional clutches having an external housing drivingly connected to said input shaft, a centrifugal clutch having a driving portion and a driven portion, said centrifugal clutch driving portion secured to one of said directional clutch housings and rotating as a unit therewith, said centrifugal clutch driven portion constructed and arranged to be engaged and driven by said centrifugal clutch driving portion when said driving portion exceeds a predetermined angular velocity, a pressurized fluid actuated disc brake mechanism having a rotatable disc and a plurality of piston mounted brake shoes arranged to exert a braking force thereon, said rotatable disc mounted on said transmission output shaft and rotating as a unit therewith, said brake shoes supported by said transmission housing and mounted for reciprocation relative thereto, said brake shoes exerting a braking force on said rotatable disc when pressurized fluid is conducted to said disc brake mechanism, master cylinder means actuatable to produce a source of pressurized fluid, conduit means to conduct said pressurized fluid from said master cylinder means to said disc brake mechanism, said master cylinder means arranged to be actuated by said centrifugal clutch driven portion to generate a fluid pressure within said conduit means proportional to the square of said transmission input shaft speed, said fluid pressure causing said disc brake mechanism to exert a braking force proportional to the square of said transmission input shaft speed upon said transmission output shaft.

3. In a transmission mechanism having four speeds in the forward direction and three speeds in the reverse direction the combination comprising a transmission housing, a first countershaft, a second countershaft, a third countershaft and a main shaft, said countershafts and said main shaft arranged in parallel spaced relation to each other within said housing, said countershafts adapted to rotate in both directions, constant mesh gearing including a pair of directional gears, connecting gears and a plurality of change speed gears, said connecting gears arranged to drivingly connect said three countershafts to each other for rotation together, a pair of directional clutches, a plurality of change speed clutches and a pair of other clutches, input and output means connected to elements of said transmission, said directional clutches adapted upon selective engagement to transmit rotation of said directional gears to said interconnected countershafts in a predetermined direction, said change speed clutches arranged upon selective engagement to transmit rotation of said interconnected countershafts to said output means to thereby provide a plurality of speeds in both directions, and said other clutches adapted upon engagement to transmit rotation from said input means through said main shaft to said output means to thereby provide an additional speed in one direction.

4. In a transmission as set forth in claim 3 in which said other clutches are positioned exteriorly of said housing, said other clutches each having an exterior casing arranged coaxially to said main shaft, an input shaft connected to the casing of one of said other clutches, and an output shaft connected to the casing of the remaining of said other clutches.

5. In a transmission as set forth in claim 4 which includes a spur gear positioned on said main shaft in rotatable relation thereto, said spur gear connected to and rotatable with one of said clutch casings, said spur gear meshing with and adapted to drive one of said directional gears.

6. In a transmission as set forth in claim 5 which includes connecting gearing positioned on said main shaft in rotatable relation thereto, a first connecting gear secured to and rotatable with said first countershaft, a second connecting gear secured to and rotatable with said third countershaft, said first and second connecting gears meshing with said gearing rotatably positioned on said main shaft.

7. In a constant mesh transmission having four speeds in one direction and three speeds in the other direction the combination comprising a transmission housing, a first countershaft, a second countershaft, a third countershaft, and a main shaft, all of said countershafts and said main shaft arranged in spaced parallel relation to each other, first and second tubular shafts coaxially positioned on said first countershaft in rotatable relation thereto, third, fourth and fifth tubular shafts coaxially positioned on said main shaft in rotatable relation thereto, sixth and seventh tubular shafts coaxially positioned on said second countershaft in rotatable relation thereto, an eighth tubular shaft coaxially positioned on said third countershaft in rotatable relation thereto, said first and second countershafts and said main shaft having their end portions projecting from said housing, said third countershaft having one end portion projecting from said housing, said first, second, third, fifth, sixth, seventh and eighth tubular shafts having portions projecting from said housing, a first directional gear secured to said first tubular shaft and rotatable therewith, a second directional gear secured to said sixth tubular shaft and rotatable therewith, said second directional gear meshing with said first directional gear, a first spur gear secured to and rotatable with said third tubular shaft, said first spur gear meshing with said first directional gear, a first connecting gear secured to and rotatable with said first countershaft, a second connecting gear secured to and rotatable with said fourth tubular shaft, said second connecting gear meshing with said first connecting gear, a third connecting gear secured to and rotatable with said second countershaft, said third connecting gear meshing with said second connecting gear, a fourth connecting gear secured to and rotatable with said fourth tubular shaft, a fifth connecting gear secured to and rotatable with said third countershaft, said fifth connecting gear meshing with said fourth connecting gear, a first change speed gear connected to and rotatable with said seventh tubular shaft, a second spur gear secured to and rotatable with said fifth tubular shaft, said first change speed gear meshing with said second spur gear, a second change speed gear secured to and rotatable with said second tubular shaft, a third spur gear secured to and rotatable with said fifth tubular shaft, said second change speed gear meshing with said third spur gear, a third change speed gear secured to and rotatable with said eighth tubular shaft, a fourth spur gear secured to and rotatable with said fifth tubular shaft, said third change speed gear meshing with said fourth spur gear, a forward directional clutch arranged to engage said first tubular shaft to said first countershaft, a reverse directional clutch arranged to engage said sixth tubular shaft to said second countershaft, a first change speed clutch arranged to engage said seventh tubular shaft to said second countershaft, a second change speed clutch arranged to engage said second tubular shaft to said first countershaft, a third change speed clutch arranged to engage said eighth tubular shaft to said third countershaft, a pair of other clutches arranged to engage said third tubular shaft and said fifth tubular shaft respectively to said main shaft, all of said clutches positioned exteriorly of said housing, said other clutches having a housing portion rotatable relative to said main shaft and secured respectively to said third and fifth tubular shafts for rotation therewith, input means connected to the housing of one of said other clutches, output means connected to the housing of the remaining of said other clutches, said directional clutches adapted upon selective engagement to rotate said first, second and third countershafts and said fourth tubular shaft in a predetermined direction, said change speed clutches adapted upon selective engagement to transmit rotation of said last named countershafts to said fifth tubular shaft in a predetermined speed, said other clutches adapted upon engagement to engage said third tubular shaft and said fifth tubular shaft to said main shaft.

8. The combination comprising a transmission having a fixed housing, a rotatable power input shaft, a rotatable power output shaft and drive means therebetween to provide a plurality of speed ratios between said input shaft and said output shaft, brake means actuatable to exert a braking force upon said transmission output shaft, actuating means for said brake means, said actuating means including speed responsive means operatively connected to said input shaft, said actuating means operatively connected to said brake means, said speed responsive means being responsive to the speed of said transmission input shaft to cause said actuating means to actuate said brake means when said input shaft speed exceeds a predetermined speed.

9. The combination comprising a transmission having a fixed housing, a rotatable power input shaft, a rotatable power output shaft and drive means therebetween to provide a plurality of speed ratios between said input shaft and said output shaft, brake means actuatable to exert a braking force upon said transmission output shaft, actuating means for said brake means, said actuating means including speed responsive means operatively connected to said input shaft, said actuating means operatively connected to said brake means, said speed responsive means being responsive to the speed of said transmission input shaft to cause said actuating means to actuate said brake means when said input shaft speed exceeds a predetermined speed, and said brake actuating means adapted upon actuation to generate a braking force on said output shaft proportional to the square of the speed of said transmission input shaft.

10. The combination comprising a transmission having a fixed housing, a rotatable power input shaft, a rotatable power output shaft, and drive means therebetween, pressurized fluid actuated means adapted to exert a braking force on said transmission output shaft when actuated, master cylinder means actuatable to produce a source of pressurized fluid, conduit means to conduct said pressurized fluid from said master cylinder means to said fluid actuated means, speed responsive means adapted to actuate said master cylinder means and cause displacement of said pressurized fluid through said conduit means, said speed responsive means responsive to said transmission input shaft speed and adapted to actuate said master cylinder means when said transmission input shaft exceeds a predetermined speed.

11. The combination of claim 10 wherein said speed responsive means is a centrifugal clutch which upon engagement thereby actuates said master cylinder means with a force proportional to the square of said transmission input shaft speed to thereby cause said pressurized fluid actuated means to be actuated by pressurized fluid having a pressure proportional to the square of said transmission input shaft speed so that said pressurized fluid actuated means exerts a braking force proportional to the square of said transmission input shaft speed upon said transmission output shaft.

12. The combination comprising a transmission having a fixed housing, a rotatable power input shaft, a rotatable power output shaft, and drive gearing driving said output shaft at angular velocities havig fixed ratios to said input shaft angular velocities, a speed responsive mechanism having a first portion operatively connected to said transmission power input shaft and arranged to rotate at an angular velocity proportional to said power input shaft angular velocity, said speed responsive mechanism having a second portion adapted to be engaged and driven by said speed responsive mechanism first portion when said first portion exceeds a predetermined angular velocity, a brake mechanism having a first brake element operatively connected to said transmission power output shaft and arranged to rotate at an angular velocity proportional to said power output shaft angular velocity, said brake mechanism having a second pressurized fluid actuated brake element adapted to exert a braking force on said first brake element when actuated by fluid under pressure, master cylinder means actuatable to produce a source of pressurized fluid, conduit means to conduct said pressurized fluid from said master cylinder means to said second brake element, said master cylinder means arranged to be actuated by said speed responsive mechanism second portion upon rotation of said second portion, the actuation of said master cylinder means permitting flow of pressurized fluid through said conduit means to thereby actuate said second brake element.

13. The combination comprising a transmission having a fixed housing, a rotatable power input shaft, a rotatable power output shaft, and drive gearing driving said output shaft at angular velocities having fixed ratios to said input shaft angular velocities, a centrifugal clutch having a driving portion and a driven portion, said centrifugal clutch driving portion geared to said transmission input shaft to rotate at an angular velocity having a fixed ratio to said input shaft angular velocity, said centrifugal clutch driven portion constructed and arranged to be engaged and driven by said clutch driving portion with a driving force proportional to the square of said transmission input shaft angular velocity when said driving portion exceeds a predetermined angular velocity, a pressurized fluid actuated disc brake mechanism having a rotatable disc and a plurality of piston mounted brake shoes arranged to exert a braking force thereon, said rotatable disc mounted on said transmission output shaft for rotation therewith, said brake shoes supported by said transmission housing and mounted for reciprocation relative thereto, said brake shoes exerting a braking force on said rotatable disc when pressurized fluid is conducted to said disc brake mechanism, master cylinder means actuatable to produce a source of pressurized fluid, conduit means to conduct said pressurized fluid from said master cylinder means to said disc brake mechanism, said master cylinder means arranged to be actuated by said clutch driven portion to generate a fluid pressure proportional to the square of said transmission input shaft angular velocity within said conduit means, said fluid pressure causing said disc brake mechanism to exert a braking force proportional to the square of said transmission input shaft angular velocity upon said transmission output shaft.

References Cited in the file of this patent

UNITED STATES PATENTS

| | | |
|---|---|---|
| 2,138,426 | Nelson | Nov. 29, 1938 |
| 2,266,213 | Kattwinkel | Dec. 16, 1941 |
| 2,323,208 | Eaton | June 29, 1943 |
| 2,500,562 | Oliver | Mar. 14, 1950 |
| 2,553,376 | Le Tourneau | May 15, 1951 |